Nov. 23, 1954 G. TRAUTVETTER 2,695,206

TELEVISION CABINET

Filed Jan. 19, 1954 3 Sheets-Sheet 1

INVENTOR
GEORGE TRAUTVETTER,

BY Robert B. Larson
ATTORNEY

Nov. 23, 1954 G. TRAUTVETTER 2,695,206

TELEVISION CABINET

Filed Jan. 19, 1954 3 Sheets-Sheet 2

INVENTOR

GEORGE TRAUTVETTER,

BY Robert B [signature]

ATTORNEY

Nov. 23, 1954 G. TRAUTVETTER 2,695,206

TELEVISION CABINET

Filed Jan. 19, 1954 3 Sheets-Sheet 3

INVENTOR

GEORGE TRAUTVETTER,

BY Robert B. [signature]

ATTORNEY

United States Patent Office 2,695,206
Patented Nov. 23, 1954

2,695,206

TELEVISION CABINET

George Trautvetter, Jenkintown, Pa., assignor to Heintz Manufacturing Company, Philadelphia, Pa., a corporation of Pennsylvania Application January 19, 1954, Serial No. 404,884

3 Claims. (Cl. 312—7)

This invention relates to a cabinet for a television set, and more particularly to a cabinet having part of the front portion thereof made of rolled metal sections.

The principal object of this invention is to provide an improved front portion for a metal television cabinet. In accordance with this invention, the front portion is constructed utilizing rolled metal sections, which are secured about the front outside edges of the metal cabinet.

A further object is to reduce the cost of manufacturing a front panel for a metal television cabinet.

In the past, television cabinets have been made of wood, plastic, and metal. Cabinets of wood and plastic are, of course, much less durable than those of metal, and have a tendency to warp and crack. Metal television cabinets have had the disadvantage of comparatively high tool cost. In addition, there have been certain disadvantages connected with the making of metal cabinets, for some of the operations involved in the manufacture are quite costly and involved.

One of the difficulties connected with making a metal television cabinet has been the formation of the front portion, wherein the picture tube and the adjustment knobs are located.

If the metal front portion is stamped from a single piece of metal, the use of expensive dies and special tools is unavoidable, and because of the inherent expense of such dies and tools, it is necessary to employ a particular style of cabinet for some time in order to justify the expense of the operation. Since in the television industry, as in the automobile and other related industries, frequent changes in the styling are necessary from the standpoint of sales promotion, it is quite uneconomical to stamp the front portion of the television cabinet. Moreover, with a stamped front portion, it is not possible to get very sharp edges at the four corners of the front portion.

Alternatively, it has been possible to employ a die-cast front portion in a metal television cabinet. However, such is proven quite unsatisfactory from both the standpoint of expense and from the standpoint of time, for several finishing operations are typically required.

The present invention overcomes many disadvantages involved in previous constructions of the front portion of a metal cabinet, and comprises a metal television cabinet having a front portion made up of a front panel that is held in place by rolled metal sections. By "rolled metal sections" it is meant sections made of sheet steel that has been rolled with rolling dies so as to provide cross-sectional configurations of predetermined design. Those used in accordance with this invention are generally of cross-section forming a partial enclosure, such as variations of U-shapes.

The front panel referred to above may consist of a control panel, wherein the control knobs are located, a kinescope mask, and if a console model cabinet is involved, a loud speaker assembly. Such construction makes it possible to reduce substantially the weight of the cabinet, in addition to lessening the expense thereof.

The rolled metal sections used to hold the components of the front panel in position permit a very versatile front portion to be created, which is easily modified by the manufacturer so as to change the styling thereof.

The reduction of weight and expense referred to above is made possible by the use of sheet steel for the entire construction of the cabinet, which eliminates the skeleton frame of metal, found in many previous television cabinets made of metal. In this manner, transportation and freight charges, which constitute one of the major items in the ultimate cost of a television receiver are substantially lessened.

Such a cabinet construction has very obvious advantages over cabinets made of wood, for the substantial amount of heat to be dissipated from a television set tends to dry out conventional furniture joints, and to cause ultimately a cabinet disintegration. Also, the fragility of a cabinet made of wood or plastic is obviated, for the present cabinet will withstand being moved from location to location without being broken or cracked.

The present invention therefore provides a cabinet construction that possesses substantial strength, and which can be very rapidly and economically manufactured in quantity. Also, a front portion employing the very versatile rolled sections permits the manufacturer to modify the front panel of the cabinet very quickly and easily, making changes in styling quite inexpensive.

The invention is clearly illustrated in the acompanying drawings, in which.

Figure 1:
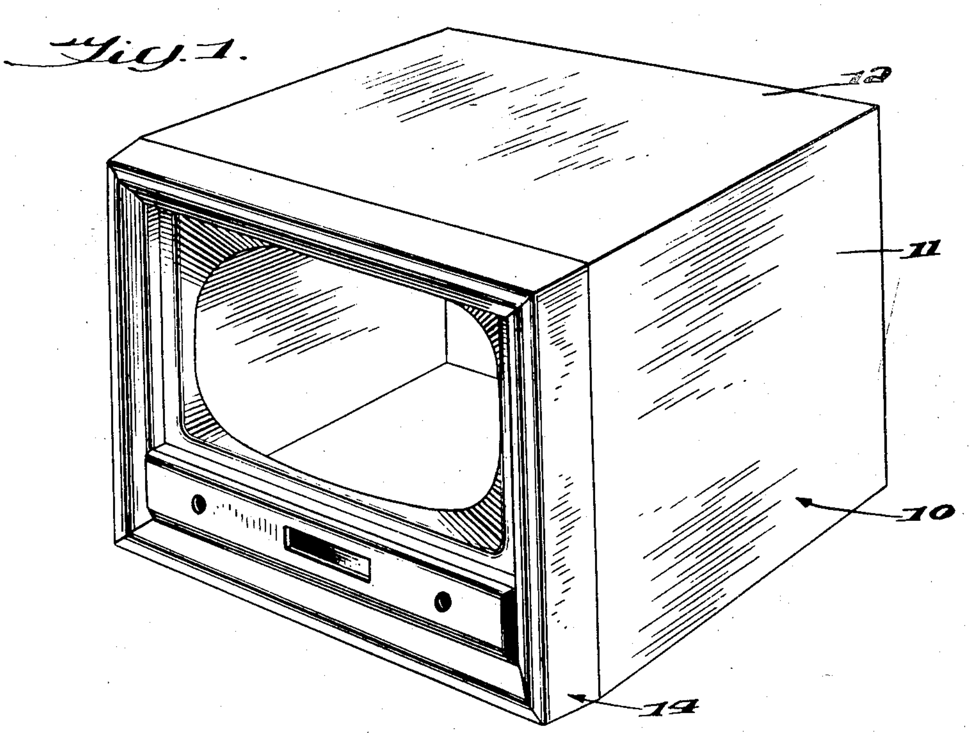
Fig. 1 is a perspective view of a metal television cabinet having a front portion employing rolled metal sections.

Referring to Fig. 1 of the drawing, which is merely illustrative of one form of the invention, the reference numeral 10 designates a table model television cabinet made entirely, or almost entirely, of sheet metal.

The sides 11 as well as the top 12, and the bottom of the cabinet are made of sheet steel, which can be fabricated in a well known manner. The front edges of sides 11, top 12, and the bottom panel of the cabinet are bent over for a short distance so as to provide a shoulder 13 on the inside of the front edge of each panel. As is to be seen in Figs. 3–5, these shoulders 13 are preferably 90° to the sides, top and bottom of the cabinet, and form a ready means to which the rolled sections and the other components forming the front portion of the cabinet can be secured.

Figure 3:
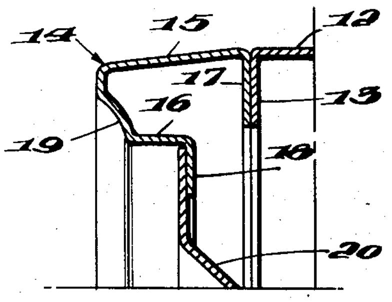
Fig. 3 is a cross-sectional view taken along lines 3—3 of Fig. 2.
Figure 5:
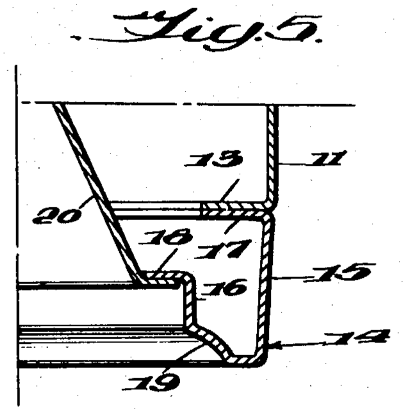
Fig. 5 is a cross-sectional view taken along line 5—5 of Fig. 2.
Figure 4:
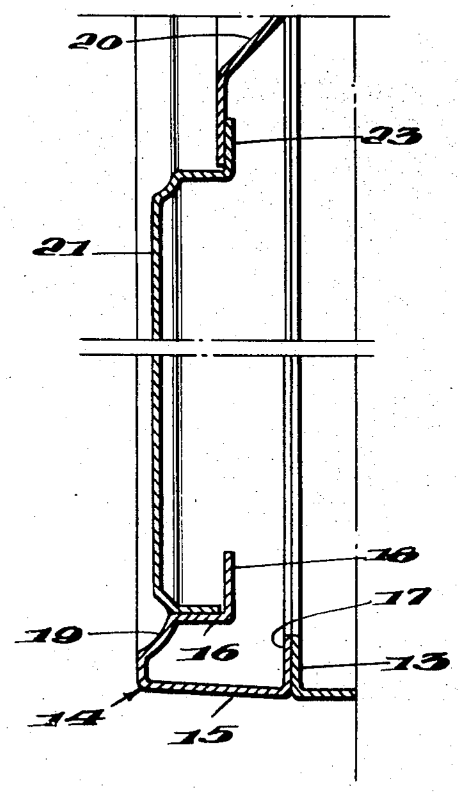
Fig. 4 is a cross-sectional view taken along lines 4—4 of Fig. 2.

In Fig. 1, the construction of the front panel of the cabinet employs four rolled metal sections 14, which can be formed from four separate pieces of rolled metal, or else from a single strip of rolled metal that has been slit at appropriate locations, bent at right angles at each of those locations so as to form a rectangular frame, and then welded along the mating edges of each slit so as to create the effect shown in this figure of drawing. As shown in Figs. 3–5 these sections 14 have a cross-section that is essentially a somewhat distorted U. Apparent in these three figures is the long leg 15 and the short leg 16 of the U, each leg having a bent-over portion or flange, shown at 17 and 18, respectively.

The flange 17 on the long leg 15 is of approximately the same width as the width of the shoulders 13 on the sides, top and bottom panels of the cabinet. Upon the flange portions 17 of the long legs being welded (or otherwise secured) to the shoulders 13, a "molding," in effect, is formed about the front of the cabinet. By employing appropriate rolling dies, the portion 19 of the rolled sections 14 can be creased or imprinted during manufacture so as to create a very attractive effect.

Figure 7:
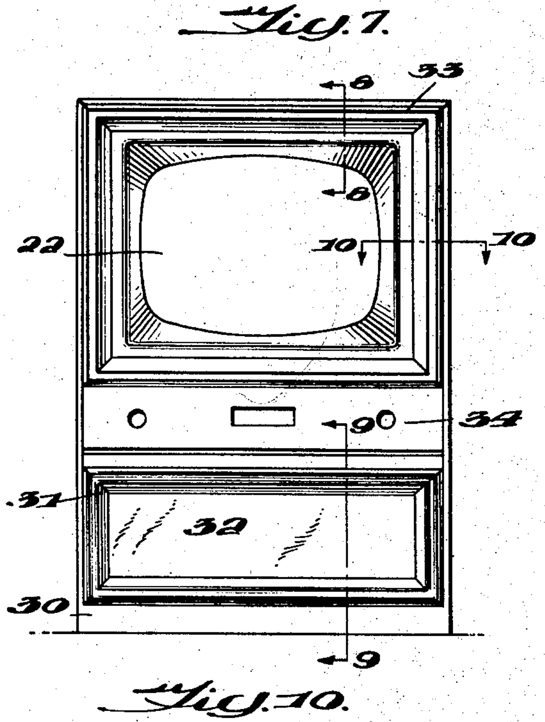
Fig. 7 is a front elevational view of a console model television cabinet having a modified front panel.
Figure 8:
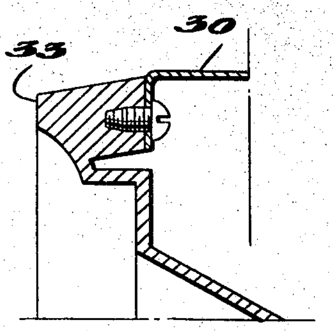
Fig. 8 is a cross-sectional view taken along lines 8—8 of Fig. 7.

The flange 18 on the short leg 16 lends itself very readily as a mounting for the kinescope mask 20, and for the loudspeaker assembly in the event that a console model cabinet such as that shown in Fig. 7 is involved. The picture tube 22 is, of course, centrally disposed in the kinescope mask.

As shown in Fig. 4, the bottom edge of the control panel 21 is fastened directly to the short leg 16 of the lowermost rolled section 14. This control panel is preferably made of sheet metal, and of course, may contain several holes to accommodate the adjustment and control knobs of the television set. The ends of the control panel are secured to the short legs 16 of the two vertical rolled sections, and the top of the panel is secured to the bottom edge of the kinescope mask 20. This latter detail is also seen in Fig. 4, where the bottom edge of the kinescope mask is shown to be bent over at approximately a 40° angle in order to meet properly with the shoulder 23 that is formed along the top of the control panel.

The kinescope mask 20 surrounds the face of the picture tube 22, and is preferably made of metal, although plastic could be conveniently used. The mask can be stamped from sheet metal (or sheet plastic) or it can be otherwise shaped. The mask has a substantial measurement in depth, i. e., there is a central portion tapering away from the flat portion around the front of the mask. It is intended that the innermost edge of the central portion be contiguous or almost contiguous with the edge of the picture tube, when the picture tube is in place. The angle the central portion makes with the flat border can be observed in Figs. 3 and 5.

Figs. 3 and 5 illustrate how the sections 14 are secured to the television cabinet. When the sections have been so secured to the cabinet, the long legs 15 of the section form a virtually uninterrupted continuation of the side, top and bottom of the cabinet. By using rolled sections as described, not only as a smooth, attractive transition formed between the sides, top and bottom of the cabinet and the front panel, but also the attachment of the kinescope mask around the picture tube and the control panel to the location in front of the tuning knobs is simplified.

The flange 18 of the short leg 16 of the rolled metal sections forms a very convenient mounting means for the kinescope mask, and makes it unnecessary to secure the mask to any portion of the cabinet other than to the rolled sections. Any suitable fastening means can be employed, and the mask may be made removable from the rolled sections if desired.

In order that the rolled sections may be welded or otherwise secured to cabinet 10, it has been found to be necessary to leave at least 7⁄16 of an inch clearance between the flange 17 and the portion 16, 18 of the section, in order that welding equipment, if that be used, can be inserted therein for the purpose of welding the members together. As stated before, the four parts of the front section can be made from a single length of rolled metal, or else made from four separate rolled sections, each having an edge prepared for meeting with the adjacent sections.

In this manner, the front portion of a metal television cabinet can be made by utilizing rolled metal section, which is done at far less expense than if the front portion were made entirely of expensive metal stampings or die-cast portions. These rolled metal sections, being very versatile, can be employed to form many variations of front panels, thereby simplfying the changes made necessary by changes in design. Also, by the use of rolled sections, it is possible to obtain very sharp edges at the four corners, if it be desired. The front panel, of course, can be painted or otherwise finished in the usual manner.

Figure 2:
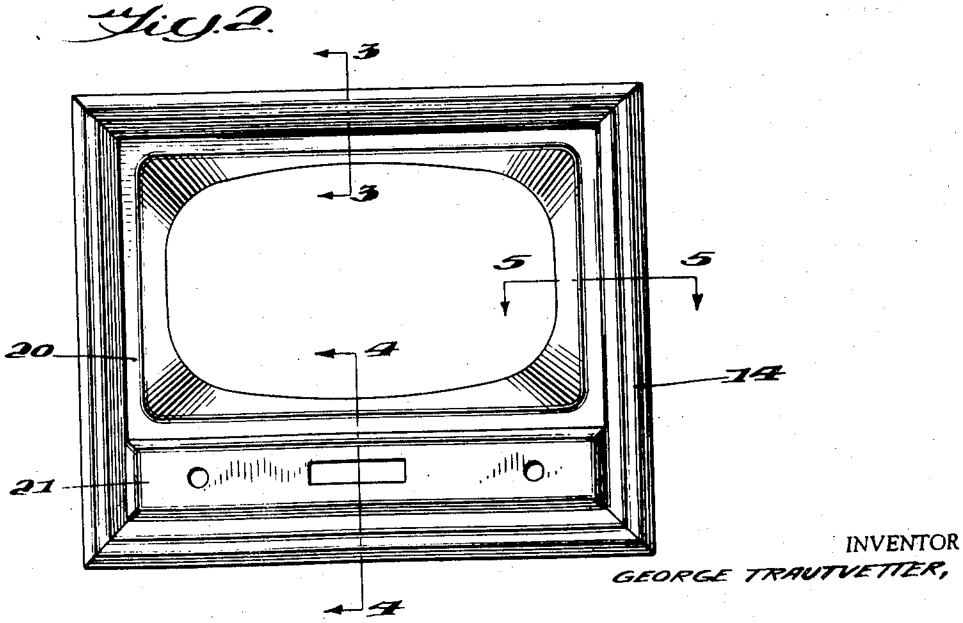
Fig. 2 is a front elevational view of the cabinet shown in Fig. 1.
Figure 6:
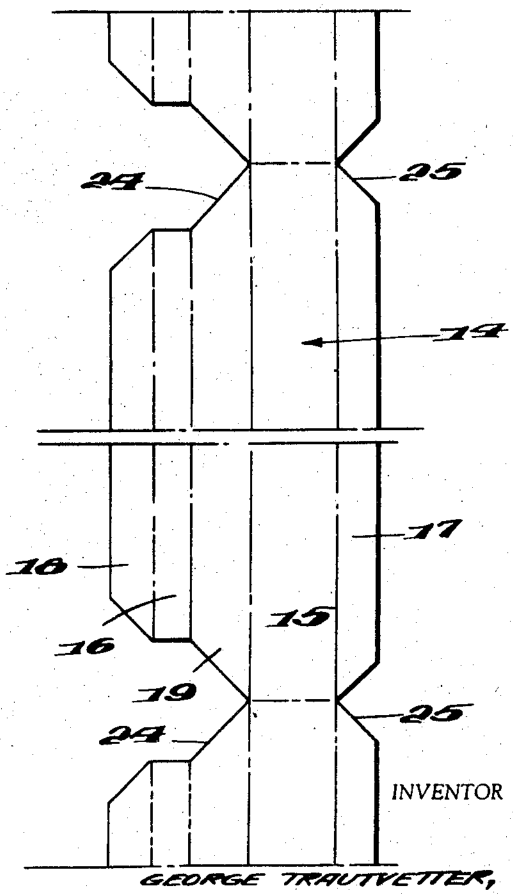
Fig. 6 is a plan view of a rolled metal section that has been flattened.

Fig. 6 of the drawing illustrates how the rolled metal section 14 for a television cabinet can be made of a single strip of rolled metal that has been slit at appropriate locations, bent so as to bring the slitted edges together, and then welded so as to make the box-like structure shown in Figs. 1 and 2 of the drawing. In the present figure, the rolled metal section has been flattened out from its normal distorted U-shaped configuration so as to illustrate where the creases and folds in the sheet metal are created by the rolling dies. Upon the section being folded at 90° at each location between the slits 24 and the slits 25, the edges of each slit can be brought together and welded so as to form the rigid corners in the rolled sections that are to be seen in Figs. 1 and 2 of the drawing.

As is to be seen in Fig. 7, rolled metal sections can be utilized to form the front portion of a console model television cabinet. In this particular figure, a modified form of construction is used, in which the upper panel of the front portion is a die-cast section 33, instead of being made of rolled sections as in the table model version.

Figure 9:
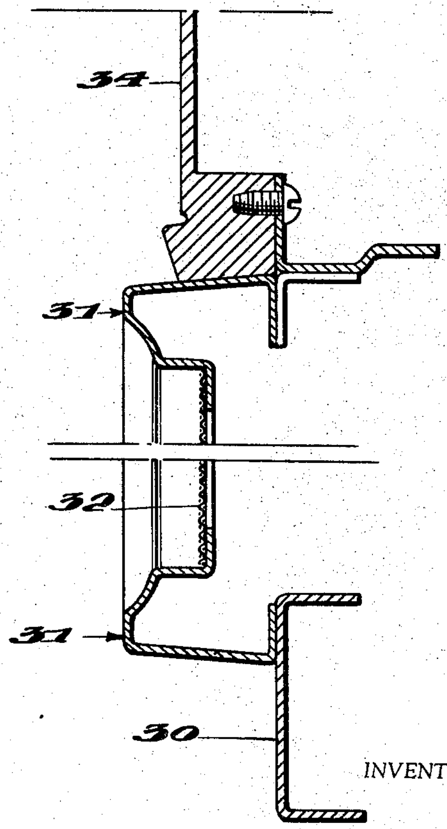
Fig. 9 is a cross-sectional view taken along lines 9—9 of Fig. 7.
Figure 10:
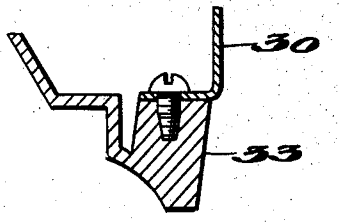
Fig. 10 is a cross-sectional view taken along lines 10—10 of Fig. 7.

The lower panel, however, is constructed utilizing rolled metal sections 31, which can be fastened directly to the cabinet body 30, as is to be seen in Fig. 9. The covering 32 for the loudspeaker, as well as the loudspeaker assembly itself can be supported by the flanges along the short legs of the U-shaped sections 31.

Fig. 9 is a good illustration of the versatility of the rolled metal sections, for this figure illustrates how the rolled metal sections 31 can be used in conjunction with other types of front panel construction, such as the die-cast panel 33. Of course, if desired, a console model cabinet could be made without the use of the die-cast portion forming the upper panel, for rolled metal sections could extend the entire length of the sides of the front portion, instead of terminating at the control panel 34 as presently illustrated.

Figure 11:
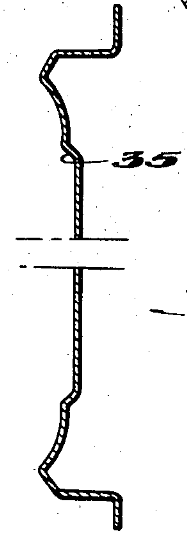
Fig. 11 is a cross-sectional view of the modified form of control panel.

Fig. 11 shows a modified form of control panel made from rolled metal section, and illustrates one of the many forms of control panel that can be used to replace the comparatively plain control panel 21 shown in Fig. 4, if the manufacturer desires to modify the appearance of the front portion of the cabinet. This modified form of control panel 35 can be secured directly to the body of the cabinet itself, or to a flange portion of the U-shaped rolled metal sections.

The invention described provides a very practical, attractive and efficient television cabinet structure which has proven exceptionally durable in service and which can be manufactured at a comparatively low cost. The invention is defined in the appended claims and it is to be considered comprehensive of all forms of structure coming within their scope.

I claim:

1. In a metal television cabinet, a front cabinet portion employing rolled metal sections secured around the front edges of said cabinet; said rolled metal sections being of a generally U-shaped cross section, the legs of the U being of different length and each leg having a bent over flange at the outer end thereof; the flange on the longer leg being turned inwardly and secured to said front edges of said cabinet, a rectangular stamped kinescope mask having an inwardly extending tapered portion and an outwardly extending flange, the flange on the shorter leg of the U being secured to said outwardly extending flange, said kinescope mask serving to reinforce said front cabinet portion.

2. An apparatus according to claim 1, including a control panel having an inwardly bent flange secured to a portion of the flange on the shorter leg of the U.

3. An apparatus according to claim 2, including a concave portion on said shorter leg to form an inwardly rolled crease adjacent the flange on the shorter leg of the U.

References Cited in the file of this patent

UNITED STATES PATENTS

| Number | Name | Date |
|---|---|---|
| 1,920,797 | Jones | Aug. 1, 1933 |
| 2,042,848 | Horn | June 2, 1936 |
| 2,095,583 | Wigeland | Oct. 12, 1937 |
| 2,225,958 | Mandel | Dec. 24, 1940 |
| 2,418,152 | Avery | Apr. 1, 1947 |
| 2,438,108 | Barler | Mar. 23, 1948 |
| 2,470,620 | Jackson | May 17, 1949 |
| 2,543,146 | Bace | Feb. 27, 1951 |